(12) United States Patent
Nilekar (10) Patent No.: US 12,340,399 B2
(45) Date of Patent: Jun. 24, 2025

(54) SYSTEM AND METHOD FOR PROVIDING UNIFORM PLATFORM FOR ACCESSING EXTERNAL CLOUD VENDORS

(71) Applicant: JPMorgan Chase Bank, N.A., New York, NY (US)

(72) Inventor: Rohit Nilekar, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 219 days.

(21) Appl. No.: 18/103,892

(22) Filed: Jan. 31, 2023

(65) Prior Publication Data

US 2023/0325894 A1    Oct. 12, 2023

(30) Foreign Application Priority Data

Apr. 7, 2022    (IN) .............................. 202211020834

(51) Int. Cl.
  *G06Q 30/06*    (2023.01)
  *G06Q 30/0601*   (2023.01)

(52) U.S. Cl.
  CPC ................ *G06Q 30/0601* (2013.01)

(58) Field of Classification Search
  CPC ................................................. G06Q 30/0601
  USPC ....................................................... 705/26.1
  See application file for complete search history.

(56) References Cited

U.S. PATENT DOCUMENTS 10,827,062 B1 * 11/2020 Paiva ................. H04M 3/5232
11,010,191 B1 *  5/2021 Hornbeck ............ H04L 67/133

FOREIGN PATENT DOCUMENTS

CN       111125232 A  *  5/2020  ......... G06F 16/2282
WO  WO-2019204307 A1 * 10/2019  ........... G06Q 20/127

OTHER PUBLICATIONS

Article, "Hodges-Mace Wins Top 25 HR Technology Provider Award for Delivering Personalized Benefit Solutions to Drive Employee Engagement ICT Monitor Worldwide Amman" Disco Digital Media, Inc. (May 17, 2019) retrieved from Dialog on Feb. 22, 2025 (Year: 2019).*

* cited by examiner

*Primary Examiner* — Yogesh C Garg
(74) *Attorney, Agent, or Firm* — GREENBLUM AND BERNSTEIN, P.L.C.

(57) ABSTRACT

A system and method for providing a uniform vendor agnostic platform for uniformly accessing public cloud vendor service data is disclosed. The method includes acquiring, via a public cloud network interface, communication data associated with communication facilitated via a public cloud vendor; ingesting and storing, the acquired communication data, on a server residing on an internal network of a target entity; receiving, a request for the communication data, on a client device residing on the internal network; transmitting the request for the communication data to the server residing on the internal network; retrieving, in response to receiving the request for the communication data, the requested communication data from the server residing on the internal network without making a separate request to the public cloud vendor in response to the received request; and transmitting the retrieved communication data to the client device.

17 Claims, 7 Drawing Sheets

SYSTEM AND METHOD FOR PROVIDING UNIFORM PLATFORM FOR ACCESSING EXTERNAL CLOUD VENDORS

CROSS-REFERENCE TO RELATED APPLICATION(S)

This application claims priority benefit from Indian Application No. 202211020834, filed Apr. 7, 2022, which is hereby incorporated by reference in its entirety.

TECHNICAL FIELD

This disclosure generally relates to providing a uniform vendor agnostic platform, which provides a uniform front end interface or system regardless of external cloud vendors selected for providing backend public cloud services.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Presently, technology landscape is quickly changing from hosting in-house solutions to leveraging vendor solutions from the public cloud. Presently, technology solutions delivered in Unified Communications within an organization may be internally hosted. For example, applications, platforms and/or infrastructure may be running out of internal data centers. This design requires custom integration solutions and may make it very difficult to meet some of internal standards due to vendor solutions dependencies. Further, as an end user may utilize different vendors for performing different functionalities, multiple integrations with different vendors may be implemented. However, as each vendor may have unique standards, capabilities, and requirements, user interface/experience with such vendors may be vastly different from one another. Such solutions may deliver disjointed experience to end users and also makes it very difficult to maintain over a period of time. Lastly, such solution may also make it difficult to change external cloud vendors without modifying end user systems.

SUMMARY

According to an aspect of the present disclosure, a method for providing a uniform vendor agnostic platform for uniformly accessing public cloud vendor service data is disclosed. The method includes performing, using a processor and a memory: acquiring, via a public cloud network interface, communication data associated with communication facilitated via a public cloud vendor; ingesting and storing, the acquired communication data, on a server residing on an internal network of a target entity; receiving, a request for the communication data, on a client device residing on the internal network; transmitting the request for the communication data to the server residing on the internal network; retrieving, in response to receiving the request for the communication data, the requested communication data from the server residing on the internal network without making a separate request to the public cloud vendor in response to the received request; and transmitting the retrieved communication data to the client device.

According to another aspect of the present disclosure, the communication data includes data on a communication transmitted by the client device.

According to another aspect of the present disclosure, the communication data is acquired from the public cloud vendor via a batch processing.

According to yet another aspect of the present disclosure, the communication data is acquired from the public cloud vendor in response to an event.

According to another aspect of the present disclosure, the communication data is acquired from the public cloud vendor in response to data volume.

According to a further aspect of the present disclosure, the communication data associated with the communication facilitated via the public cloud vendor is retrieved within the internal network.

According to yet another aspect of the present disclosure, the communication data is retrieved in real-time.

According to a further aspect of the present disclosure, the communication data is acquired from the public cloud vendor as provided by one or more machine learning algorithms.

According to another aspect of the present disclosure, the public cloud vendor is configured to be replaced by a new public cloud vendor without modification on the client device.

According to a further aspect of the present disclosure, only the public cloud network interface portion of the internal network is modified to accommodate the new public cloud vendor when the public cloud vendor is replaced with the new public cloud vendor.

According to another aspect of the present disclosure, a system for providing a uniform vendor agnostic platform for uniformly accessing public cloud vendor service data is disclosed. The system includes at least one processor; at least one memory; and at least one communication circuit. The at least one processor is configured to perform: acquiring, via a public cloud network interface, communication data associated with communication facilitated via a public cloud vendor; ingesting and storing, the acquired communication data, on a server residing on an internal network of a target entity; receiving, a request for the communication data, on a client device residing on the internal network; transmitting the request for the communication data to the server residing on the internal network; retrieving, in response to receiving the request for the communication data, the requested communication data from the server residing on the internal network without making a separate request to the public cloud vendor in response to the received request; and transmitting the retrieved communication data to the client device.

According to another aspect of the present disclosure, a non-transitory computer readable storage medium that stores a computer program for providing a uniform vendor agnostic platform for uniformly accessing public cloud vendor service data is disclosed. The computer program, when executed by a processor, causing a system to perform a process including acquiring, via a public cloud network interface, communication data associated with communication facilitated via a public cloud vendor; ingesting and storing, the acquired communication data, on a server residing on an internal network of a target entity; receiving, a request for the communication data, on a client device residing on the internal network; transmitting the request for the communication data to the server residing on the internal network; retrieving, in response to receiving the request for the communication data, the requested communication data from the server residing on the internal network without making a separate request to the public cloud vendor in response to the received request; and transmitting the retrieved communication data to the client device.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
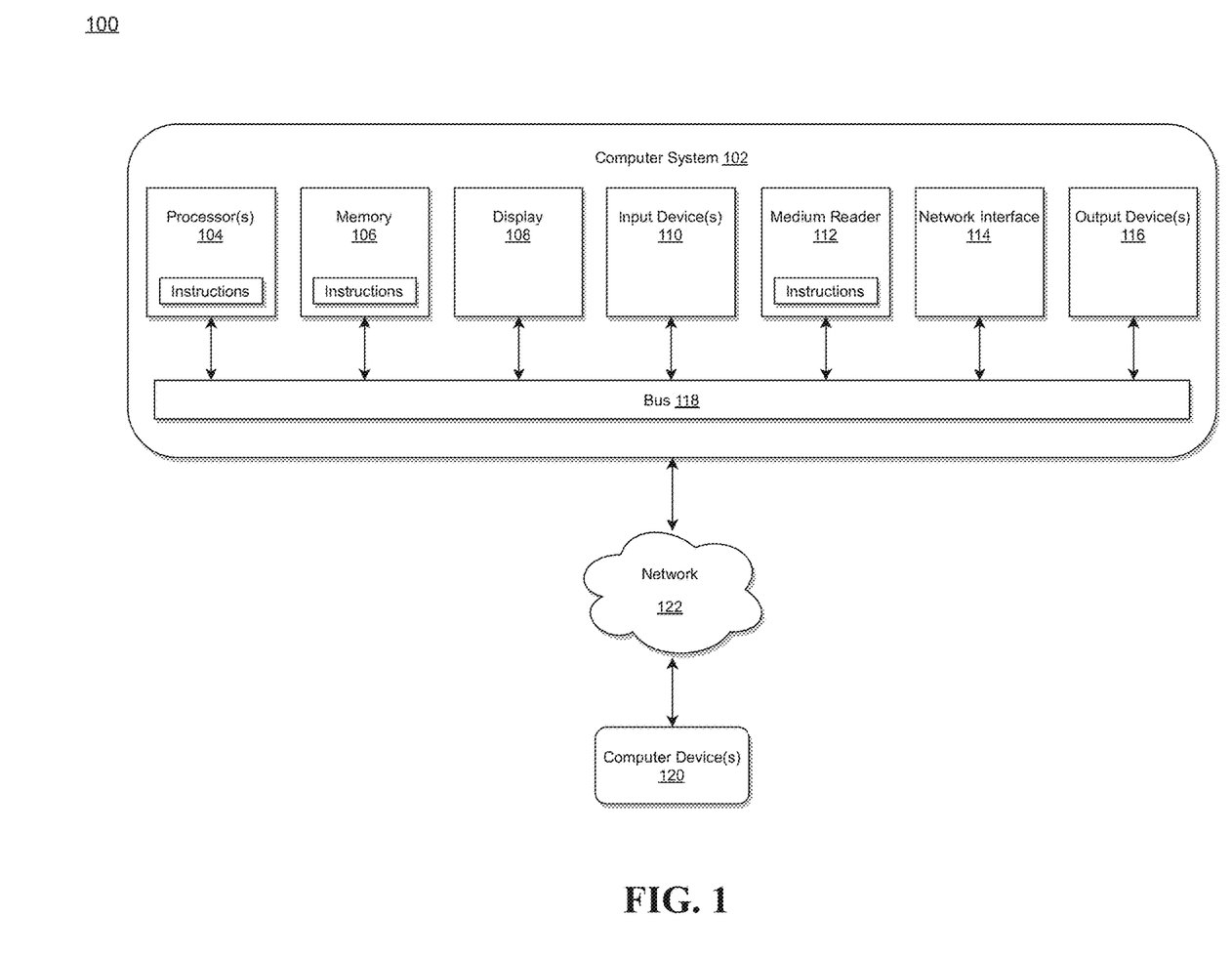
FIG. 1 illustrates a computer system for implementing a uniform vendor platform that allows access to external cloud services in accordance with an exemplary embodiment.

FIG. 1 illustrates a computer system for implementing a uniform vendor platform that allows access to external cloud services in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
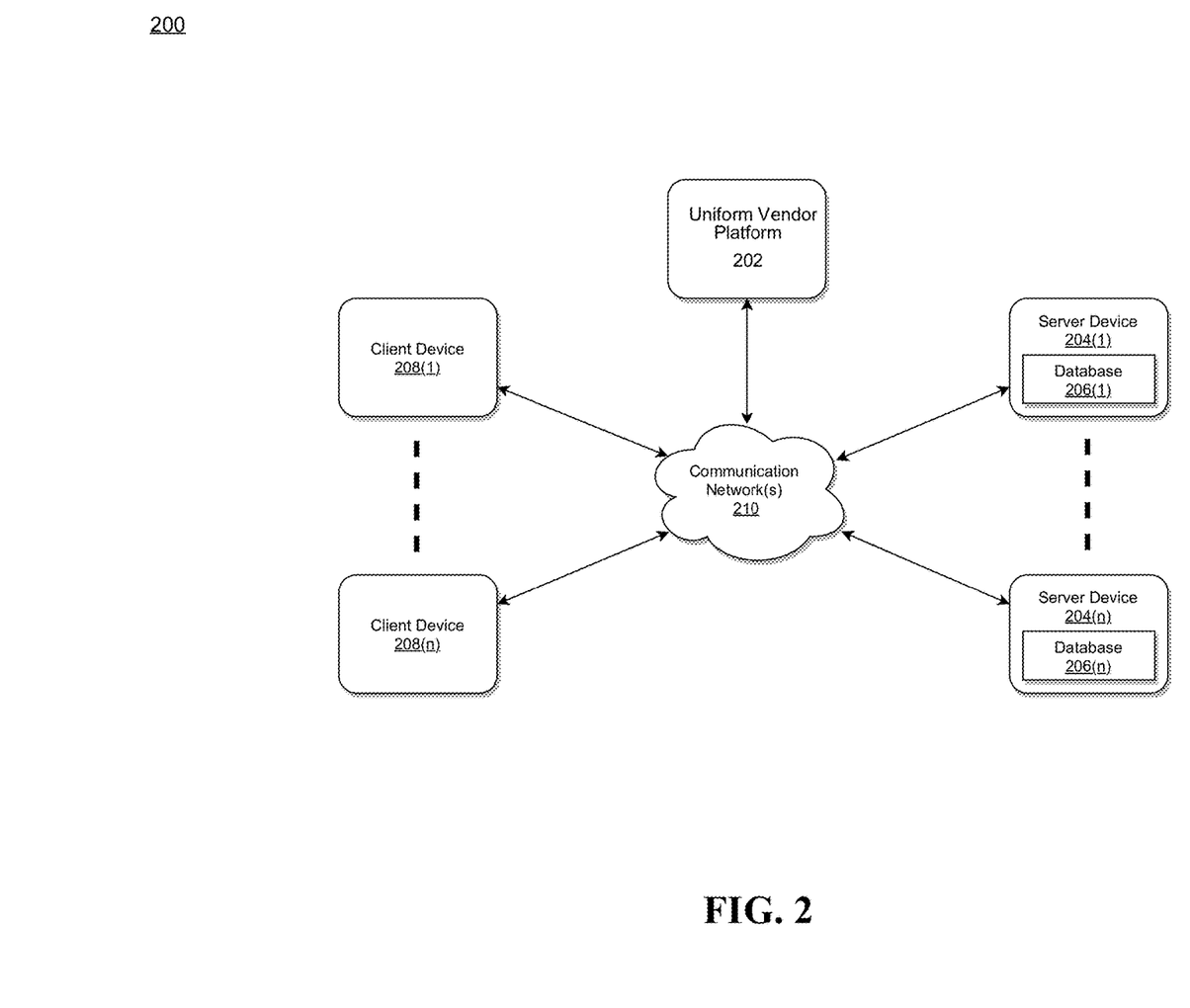
FIG. 2 illustrates an exemplary diagram of a network environment with a uniform vendor platform that allows access to external cloud services in accordance with an exemplary embodiment.

FIG. 2 illustrates an exemplary diagram of a network environment with a uniform vendor platform that allows access to external cloud services in accordance with an exemplary embodiment.

A uniform vendor platform (UVP) system 202 may be the same or similar to the computer system 102 as described with respect to FIG. 1.

The UVP system 202 may store one or more applications that can include executable instructions that, when executed by the UVP system 202, cause the UVP system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the UVP system 202 itself, may be located in virtual server(s) running in a cloud-based computing environment rather than being tied to one or more specific physical network computing devices. Also, the application(s) may be running in one or more virtual machines (VMs) executing on the UVP system 202. Additionally, in one or more embodiments of this technology, virtual machine(s) running on the UVP system 202 may be managed or supervised by a hypervisor.

In the network environment 200 of FIG. 2, the UVP system 202 is coupled to a plurality of server devices 204(1)-204(n) that hosts a plurality of databases 206(1)-206(n), and also to a plurality of client devices 208(1)-208(n) via communication network(s) 210. A communication interface of the UVP system 202, such as the network interface 114 of the computer system 102 of FIG. 1, operatively couples and communicates between the UVP system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the UVP system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The UVP system 202 may be a standalone device or integrated with one or more other devices or apparatuses, such as one or more of the server devices 204(1)-204(n), for example. In one particular example, the UVP system 202 may be hosted by one of the server devices 204(1)-204(n), and other arrangements are also possible. Moreover, one or more of the devices of the UVP system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the UVP system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the UVP system 202 that may efficiently provide a platform for implementing a cloud native UVP module, but the disclosure is not limited thereto.

The client devices 208(1)-208(n) may run interface applications, such as standard web browsers or standalone client applications, which may provide an interface to communicate with the UVP system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the UVP system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the UVP system 202, the server devices 204(1)-204(n), or the client devices 208(1)-208(n), for example, may be configured to operate as virtual instances on the same physical machine. For example, one or more of the UVP system 202, the server devices 204(1)-204(n), or the client devices 208(1)-208(n) may operate on the same physical device rather than as separate devices communicating through communication network(s) 210. Additionally, there may be more or fewer UVP systems 202, server devices 204(1)-204(n), or client devices 208(1)-208(n) than illustrated in FIG. 2. According to exemplary embodiments, the UVP system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
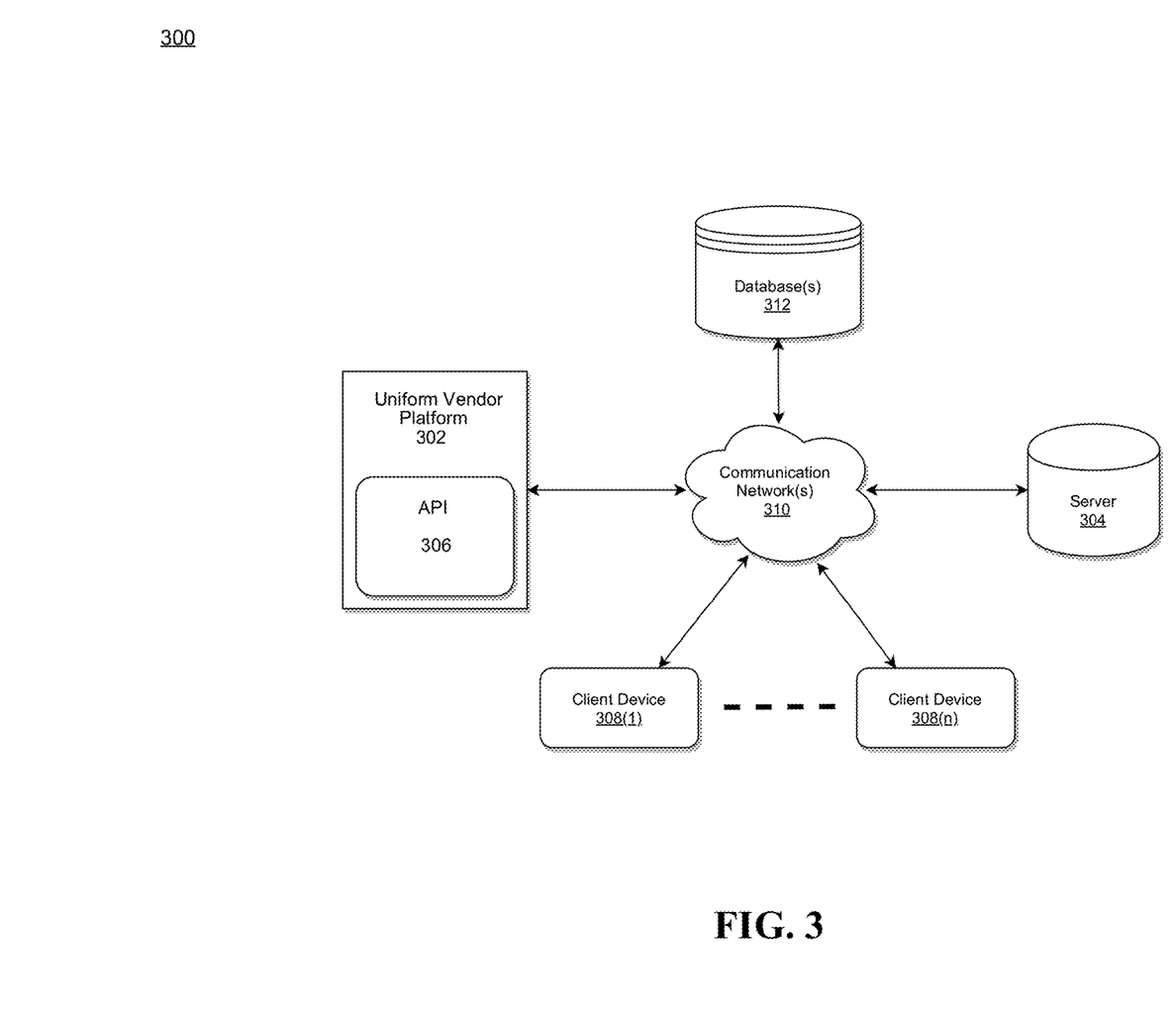
FIG. 3 illustrates a system diagram for implementing a uniform vendor platform that allows access to external cloud services in accordance with an exemplary embodiment.

FIG. 3 illustrates a system diagram for implementing a uniform vendor platform that allows access to external cloud services in accordance with an exemplary embodiment.

As illustrated in FIG. 3, the system 300 may include a site reliability engineering leaderboard system 302 within which a group of API modules 306 is embedded, a server 304, a database(s) 312, a plurality of client devices 308(1) . . . 308(n), and a communication network 310.

According to exemplary embodiments, the UVP system 302 including the API modules 306 may be connected to the server 304, and the database(s) 312 via the communication network 310. Although there is only one database has been illustrated, the disclosure is not limited thereto. Any number of databases may be utilized. The UVP System 302 may also be connected to the plurality of client devices 308(1) . . . 308(n) via the communication network 310, but the disclosure is not limited thereto.

According to exemplary embodiment, the UVP system 302 is described and shown in FIG. 3 as including the API modules 306, although it may include other rules, policies, modules, databases, or applications, for example. According to exemplary embodiments, the database(s) 312 may be embedded within the UVP system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable UVP as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the UVP system 302. In this regard, the plurality of client devices 308(1) . . . 308(n) may be "clients" of the UVP system 302 and are described herein as such. Nevertheless, it is to be known and understood that the plurality of client devices 308(1) . . . 308(n) need not necessarily be "clients" of the UVP system 302, or any entity described in association therewith herein. Any additional or alternative relationship may exist between either or both of the plurality of client devices 308(1) . . . 308(n) and the UVP system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the UVP system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The UVP system 302 may be the same or similar to the UVP system 202 as described with respect to FIG. 2, including any features or combination of features described with respect thereto.

Figure 4:
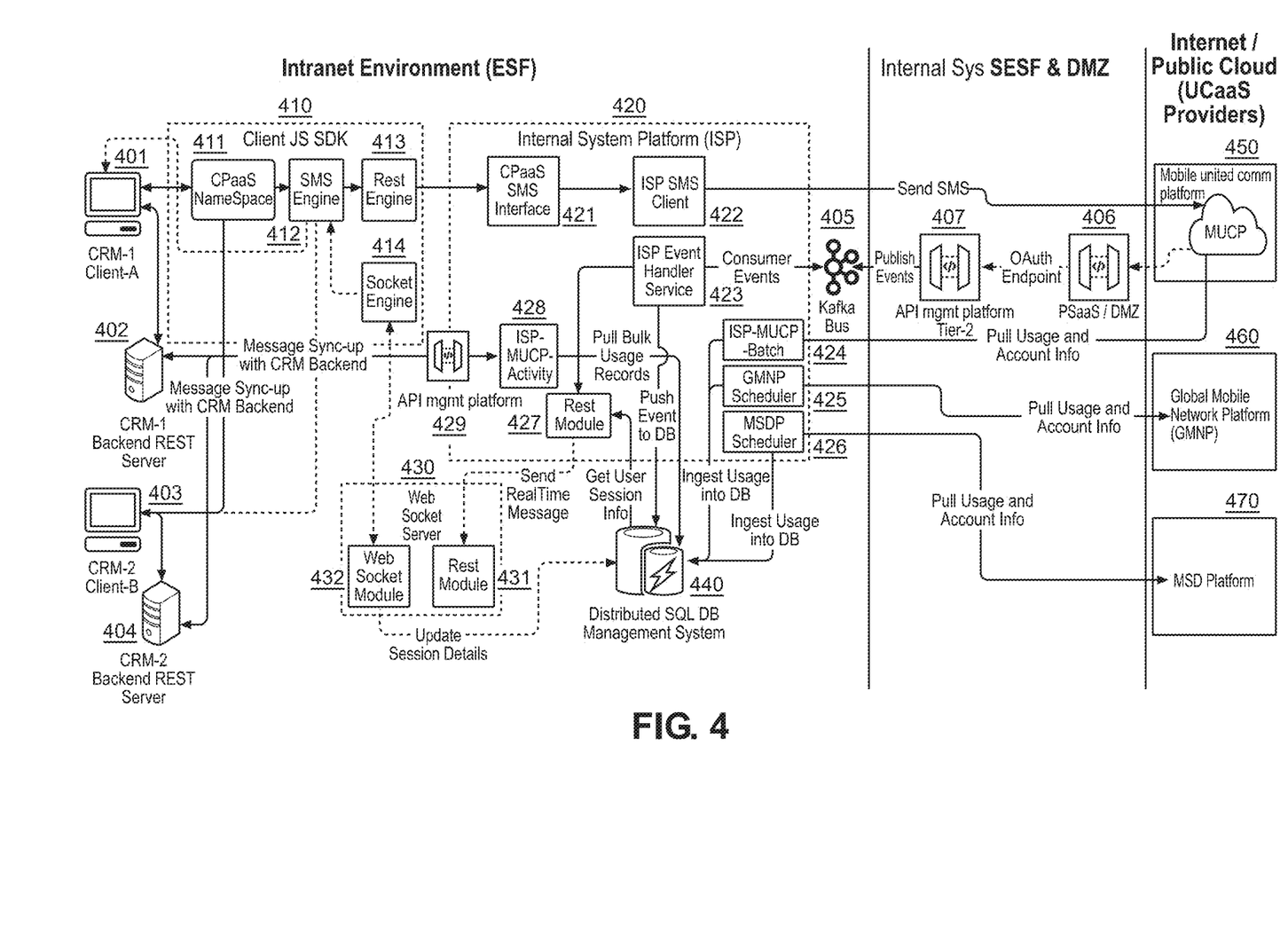
FIG. 4 illustrates a system flow for a uniform vendor platform in accordance with an exemplary embodiment.

FIG. 4 illustrates a system flow for a uniform vendor platform in accordance with an exemplary embodiment.

By providing a uniform vendor platform, one or more vendors in the space of unified communication as a service (UCaaS) providers may host services in a public cloud and may deliver multiple capabilities through a single platform, namely the uniform vendor platform. By providing a single platform to be accessed, as opposed to providing various platforms for a user to access, a more uniform experience may be provided to the user. As different vendors may specify different user interfaces, security requirements, storage requirements, integration/connectivity requirements and/or the like, it may be difficult for an organization to modify a vendor (e.g., add, remove, swap and etc.) without significantly impacting various consumer applications within an organization, potentially leading to large amount of downtime. Further, as different UCaaS providers operate differently from one another, no uniformity is provided and various redundancies may be generated, leading to inefficiencies of technical resources.

By providing a uniform vendor platform, which may be vendor agnostic, same or similar user experience may be provided regardless of the UCaaS provider that is selected for the organization. Such a vendor agnostic platform may assist an organization to remove or alleviate dependencies on the UCaaS providers.

According to exemplary aspects, the uniform vendor platform may provide a uniform and vendor agnostic experience by hosting vendor data in-house, such that regardless of which vendor used by an organization for a public cloud vendor service, the user may access the required data for the consumer or client applications used by a front end user without modification of the front end consumer or client applications. Accordingly, the users of consumer or client applications may be unaware of the vendor utilized in performing its operations as the operation of the consumer or client applications may remain the same even if a backend cloud vendor service provider may have changed.

More specifically, rather than modifying consumer or client applications to build integrations with specific cloud vendors, a generic enterprise grade platform, which may abstract vendor connectivity from internal applications and enable standard interface(s) for any internal applications to integrate. In an example, one or more backend components of an organization residing on an internal network of the organization may form a public cloud network interface portion of the internal network, such that only select backend components may be modified when switching out a public cloud vendor or service provider.

In FIG. 4, a client device 401 (Client A) may operate a customer relationship management (CRM-1) application to send and/or receive a communication, such as a SMS (Short Message Service) message, to and from an end client (e.g., customer) via a public cloud vendor service. In an example, the client device 401 may be a personal computer. Here, even if the UCaaS provider providing SMS messaging to the customer may specify using a mobile device for sending the SMS message, a standard application provided on a personal computer may be utilized for performing messaging as provided by the uniform vendor platform. Although a personal computer is described as performing the messaging, aspects of the present disclosure are not limited thereto, such that different computing devices, such as a mobile device, a cell phone or the like may be utilized for performing the communication. Also, the client device 401 may belong to one line of business (LOB) that is different from a client device 403 (Client B). In addition to the above, although the present disclosure is provided with respect to sending of an SMS message, aspects of the disclosure are not limited thereto, such that any suitable electronic communication may be utilized for transmitting and receiving a message from the customer. Further, a form of communication sent by the client device 401 may not be required to be same form of communication sent by the customer device.

When the client device 401 attempts to send an SMS message to the customer, the SMS message request is first transmitted to a client java script (JS) software development kit (SDK) unit 410. More specifically, the SMS message is transmitted to a CPaaS (Communications Platform as a Service) NameSpace unit 411, which may identify/process the request and transmits the processed request to an SMS engine 412 to generate an SMS message corresponding to the SMS message request. The generated SMS message is then sent to the REST (Representational State Transfer) Engine 413 for transferring the generated SMS message to the internal system platform (ISP) 420.

The SMS message is received at the CPaaS SMS interface 421 of the ISP 420. The received SMS message is then transmitted to the ISP SMS client 422 for transmitting the generated SMS message to the mobile unified communication platform (MUCP) 450. As illustrated in FIG. 4, MUCP 450 may be an Internet or public cloud UCaaS provider.

Also, when the client device 401 submits a request for transmit the SMS message, it also communicates with the Backend REST server 402 corresponding to CRM-1 application executed on the client device 401. The Backend REST server 402 communicates with the ISP 420 via the API management platform 429 to perform message sync-up with the CRM backend. The API management platform 429 notes the SMS message being requested to the ISP-MUCP activity 428 and stores the SMS message request transaction along with corresponding metadata in the distributed SQL database management system 440.

Once the end customer receives the SMS message sent by the client device 401, a response message may be sent by the end customer device. In an example, the response message may be an SMS message, however, aspects of the present disclosure are not limited thereto, such that the user may send a message in a different format (e.g., MMS (Multimedia Messaging Service), web-based, or the like).

The response message may then be relayed by the MUCP 450 as data, which may be processed through internal system SESF (Services and Systems Framework) and DMZ (Demilitarized Zone) components. In an example, internal system SESF and DMZ may provide a subnetwork, which contains an organization's exposed, outward-facing services. The internal systems SESF and DMZ may include the PSasS/DMZ 406 for securely receiving the response message data from the customer via an external vendor. The response message data received through the PSasS/DMZ 406 is sent to the API management platform 407 for authorization. In an example, the API management platform 407 may be a platform for managing APIs. The API management platform 407 may front services with a proxy layer to provide an abstraction for internal system APIs, thereby providing security, rate limits, quotas and analytics. Once processed by the API management platform 407, the received message is published as an event on a Kafka bus 405. In an example, the Kafka bus 405 may be a software bus that uses stream processing. The Kafka bus 405 may provide a unified, high-throughput, low-latency platform that handles real-time data feeds.

The ISP event handler service 423 residing on the ISP 420 obtains the response message data from the Kafka bus 405. The obtained response message data is then transmitted, as push event to database transaction for example, to the distributed SQL database management system 440 that is residing in the intranet environment of the organization for storage. The ISP event handler service 423 additionally transmits the response message data to the REST module 427.

The REST module 427 will then sends the received response message data to the REST module 431 residing on the WebSocket server 430. The REST module 431 transmits the received message to the web socket module 432 for communicating with the socket engine 414 residing on the client JS SDK 410. The socket engine 414 in receipt of the response message data, transmits the response message data to the SMS engine 412 for generating the response message in SMS format. The SMS formatted response message is then transmitted to the client device 401 and displayed to the user.

Client device 403 (Client B) may operate a customer relationship management (CRM-2) application to submit a request for retrieving records associated with SMS messages transmitted to and received from an external customer by the client device 1 (or any other device residing on the intranet environment). The client device 404 may transmit the retrieval request to both the API management platform 429 of the ISP 420, and the backend server 404 corresponding to CRM-2 application.

The retrieval request received by the API management platform 429 relays the request to the ISP-MUCP activity unit 428. The ISP-MUCP activity unit 428 may monitor interactions between ISP 420 residing on the intranet environment of the organization and one or more public cloud vendors, such as the MUCP 450. The ISP-MUCP activity unit 428 submits a request to pull bulk usages records from the distributed SQL DB management system 440. Although FIG. 4 illustrates the ISP-MUCP activity unit 428 making a request to pull bulk usage records, aspects of the present disclosure are not limited thereto, such that the ISP-MUCP activity unit 428 may request for such records at regular intervals or in real time. Further, ISP-MUCP activity unit 428 may receive such records that are pushed there onto, without making the pull request. In addition to the above, ISP-MUCP activity unit 428 may obtain records associated with MUCP 450 public cloud servicer or any other public cloud servicer.

The distributed SQL DB management system 440 may ingest usage information from one or more public cloud vendors via one or more ISP 420 components, namely, an ISP-MUCP-Batch unit 424, a GMNP (global mobile network platform) scheduler 425, and an MSDP scheduler 426. In an example, one or more of the ISP-MUCP-Batch unit 424, the GMNP scheduler 425, and the MSDP scheduler 426 may pull and ingest data from the MUCP 450, the GMNP 460 and the MSDP 470 in response to a request, according to a predetermined schedule, and/or according to a predetermined data amount threshold.

In an example, a frequency or schedule of data pull/ingestion may be determined according to one or more artificial intelligence (AI) or machine learning (ML) algorithms.

According to exemplary aspects, ML algorithms or models may be trained with specific inputs for performing optimized scheduling of data acquisition. In an example, AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

The distributed SQL DB management system 440 requests to obtain user session information from the REST module 427 by transmitting a get user session info command. The REST module 427 then transmits a real-time message to the REST module 431 residing in the WebSocket server 430, which then transmits the received message to the WebSocket module 432 to communicate with the socket engine 414. The result of the communication is then transmitted from the socket engine 414 to the SMS engine 412 to provide corresponding SMS message. The SMS message provided by the SMS engine 412 then transmits the SMS message to the client device 2 to be displayed thereon to the user.

Accordingly, the uniform vendor platform enables enterprises to connect to any UCaaS vendors hosted on public cloud and deliver standard and consistent integration for in-house enterprise applications without consideration or knowledge of underlying vendor solution providers. In addition to the above, the uniform vendor platform saves duplication effort for direct integration with each application in-house and makes it easier to move to any vendor in future offering better feature capabilities.

Figure 5:
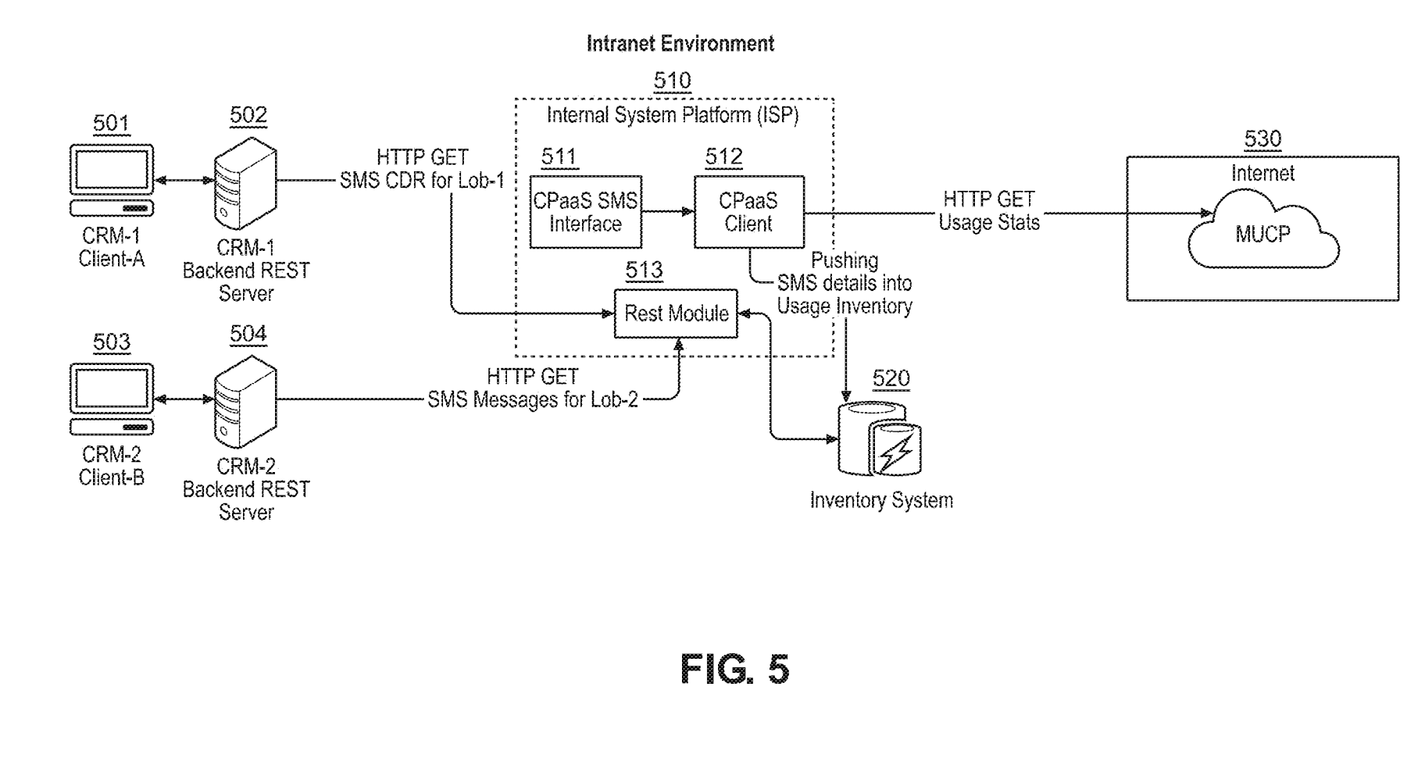
FIG. 5 illustrates a system flow for ingesting vendor data of a public cloud service provider into a uniform vendor platform in accordance with an exemplary embodiment.

FIG. 5 illustrates a system flow for ingesting vendor data of a public cloud service provider into a uniform vendor platform in accordance with an exemplary embodiment.

A client device 501 (Client A) may operate a customer relationship management application (e.g., CRM-1), which may be an application used for a particular line of business (e.g., LOB-1), to acquire call detail record (CDR) of communications, such as SMS (Short Message Service) messages, to and from an end client (e.g., customer) via a public cloud vendor service, such as the MUCP (mobile unified communication platform) 530. The client device 501 may transmit its requests and receive information via a CRM Backend REST server 502.

Similarly, another client device 503 (Client B) may operation a customer relationship management application (e.g., CRM-2), which may be an application used for a different line of business (e.g., LOB-2), to acquire CDR of SMS communications or messages, to and from an end client via the public cloud vendor service, such as the MUCP 530. The client device 503 may transmit its requests and receive information via a CRM Backend REST server 504.

The uniform vendor platform allows an LOB application to retrieve the full message details from the uniform vendor platform to ingest public cloud service provider data, such as the SMS details, into internal servers (e.g., CRM servers) residing on an organization's intranet environment. Further, the design of the uniform vendor platform may ensure right controls are in place to retrieve the data from the platform based on standard authentication (ADFS) and/or authorization (e.g., RSAM/My Access roles).

In an example, either of the client device 501 or the client device 503 may submit a request to retrieve SMS messages for respective LOBs to the REST module 513 of the internal system platform (ISP) 510. Then the REST module 513 may retrieve the records from the internal inventory system 520, which may locally store CDRs of SMS communications facilitated by the MUCP 530. Although CDRs and SMS communications are described herein, aspects of the present disclosure are not limited thereto, such that additional data records or data details may be retrieved without being limited to SMS communications.

According to exemplary aspects, SMS details may be retrieved from the MUCP 530 at regular intervals, in response to a request or an event, or based on traffic/transaction volume for internal storage at the inventory system 520. For example, a CPaaS SMS interface 511 of the ISP 510 may initiate a request to retrieve usage statistics (e.g., details of SMS transactions facilitated by the MUCP 530) of the MUCP 530 via the CPaaS Client 512 of ISP 510. Then the CPaaS Client 512 transmits a request to acquire usage statistics from the MUCP 530. Upon receipt of the SMS details from the MUCP 530, the CPaaS Client 512 may push the received data, such as the SMS details, into the usage inventory stored in the inventory system 520. Accordingly, data of transactions facilitated through the public cloud service provider, such as the MUCP 530, may be retrieved from an internal database of the organization without having to make ad-hoc requests to the MUCP 530. Such configuration allows for quicker and more reliable/controlled retrieval of external data by the internal client devices.

Figure 6:
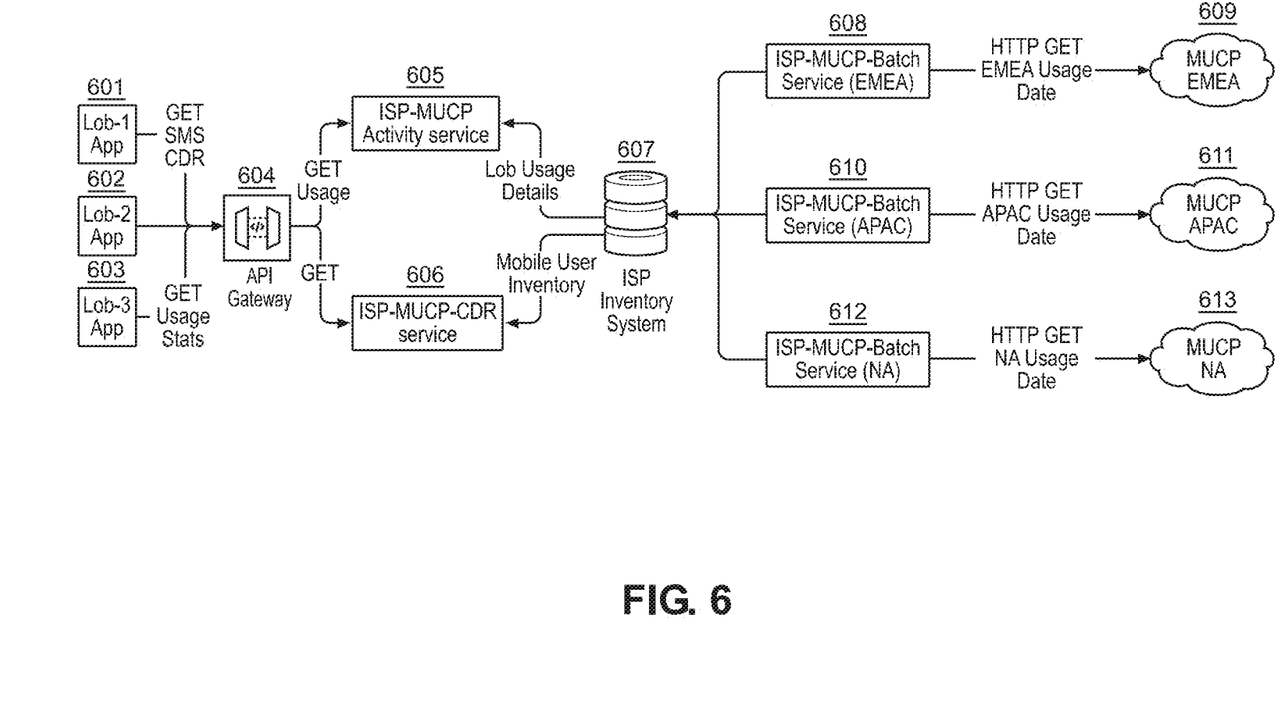
FIG. 6 illustrates a system flow for ingesting vendor data of a public cloud service provider into a uniform vendor platform in accordance with an exemplary embodiment.

FIG. 6 illustrates a system flow for ingesting vendor data of a public cloud service provider into a uniform vendor platform in accordance with an exemplary embodiment.

Various lines of businesses within an organization may access the uniform vendor platform to access one or more public cloud vendor or UCaaS provider services. Each line of business (LOB) may have its own corresponding application that it accesses for obtaining data associated with the one or more public cloud vendor or UCaaS provider services. As illustrated in FIG. 6, LOB 1 may access Lob-1 App 601 for obtaining data associated with the public cloud vendor services. Similarly, LOB 2 may access Lob-2 App 602 for obtaining data associated with the public cloud vendor services, and LOB 3 may access Lob-3 App 603 for obtaining data associated with the public cloud vendor services. One or more of these LOB applications may submit different data requests to the public cloud vendor services. The data requests may include, without limitation, for example, request for SMS CDR (e.g., GET SMS CDR) and request for usage statistics (e.g., GET Usage Stats). The data requests may be received at the API gateway 604, which may direct the received data requests to corresponding services, such as ISP-MUCP activity service 605 or ISP-MUCP-CDR service 606.

In an example, the ISP-MUCP activity service 605 and/or the ISP-MUCP-CDR service 606 may query the ISP inventory system 607 to acquire the requested data. The ISP-MUCP activity service 605 may query the ISP inventory system 607 to acquire usage details for a respective LOB. In addition, the ISP-MUCP-CDR service 606 may query the ISP inventory system 607 may acquire mobile user inventory for a respective LOB.

According to exemplary aspects, the ISP inventory system 607 may be an internal data storage server or data store that may reside on an organization's internet or internal network. The ISP inventory system 607 may extract or request data from the one or more public cloud vendors or UCaaS providers. The ISP inventory system 607 may obtain data from the public cloud vendors or UCaaS providers according to a preset schedule, in response to an event or request, or based on data traffic/volume.

Further, according to exemplary aspects, the ISP-MUCP-Batch Services may collect communication data facilitated via one or more public cloud servicers according to region. As illustrated in FIG. 6, the ISP-MUCP-Batch service for EMEA (Europe, Middle East, and Africa) region 608 may transmit a request for obtaining usage data for the EMEA region from the MUCP 609. Similarly, the ISP-MUCP-Batch service for APAC (Asia-Pacific) region 610 may transmit a request for obtaining usage data for the APAC region from the MUCP 611. Also, the ISP-MUCP-Batch service for NA (North America) region 612 may transmit a request for obtaining usage data for the NA region from the MUCP 613. The MUCP 609, 611 and 613 may transmit the requested usage data back to each of the requesting services, such as the ISP-MUCP-Batch Service (EMEA) 608, the ISP-MUCP-Batch Service (APAC) 610 and ISP-MUCP-Batch Service (NA) 612. Although FIG. 6 illustrates batch processing for requesting or acquiring of usage data for the respective regions, aspects of the present disclosure are not limited thereto, such that the usage data may be requested or acquired on demand, or in smaller groups. The acquired usage data is then stored in the ISP inventory system 607 for access or retrieval by various client devices of the organization. Further, although only EMEA, APAC and NA regions were disclosed, aspects of the present disclosure are not limited thereto.

Figure 7:
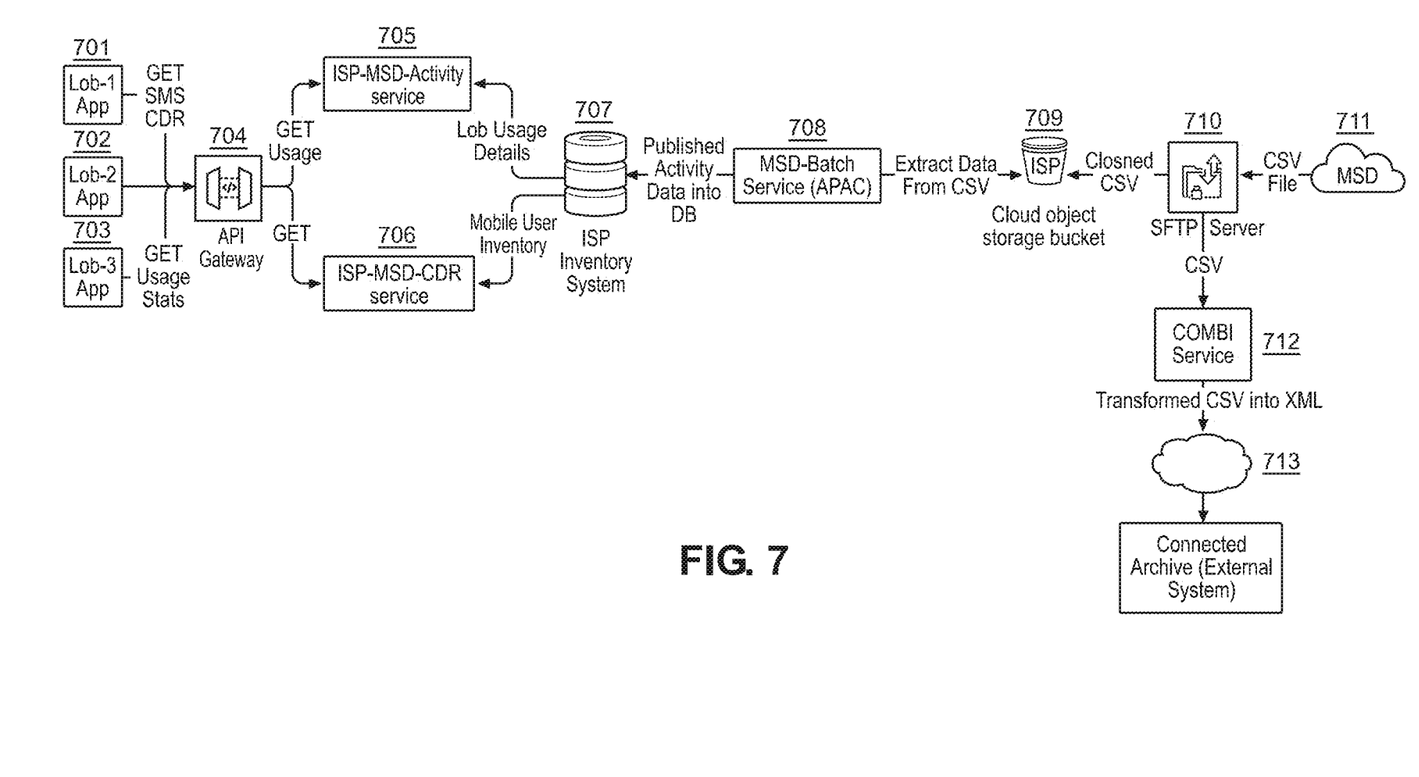
FIG. 7 illustrates a system flow for ingesting vendor data of a public cloud service provider into a uniform vendor platform in accordance with an exemplary embodiment.

FIG. 7 illustrates a system flow for ingesting vendor data of a public cloud service provider into a uniform vendor platform in accordance with an exemplary embodiment.

FIG. 7 illustrates ingestion of data from various external vendors into a uniform vendor platform. The uniform vendor platform enables a LOB application to either retrieve metadata associated with messages sent or received by the LOB applications.

Various lines of businesses within an organization may access the uniform vendor platform to access one or more public cloud vendor or UCaaS provider services. Each line of business (LOB) may have its own corresponding application that it accesses for obtaining data associated with the one or more public cloud vendor or UCaaS provider services.

As illustrated in FIG. 7, LOB 1 may access Lob-1 App 701 for obtaining data associated with the public cloud vendor services. Similarly, LOB 2 may access Lob-2 App 702 for obtaining data associated with the public cloud vendor services, and LOB 3 may access Lob-3 App 703 for obtaining data associated with the public cloud vendor services. One or more of these LOB applications may submit different data requests to the public cloud vendor services. The data requests may include, without limitation, for example, request for SMS CDR (e.g., GET SMS CDR) and request for usage statistics (e.g., GET Usage Stats). The data requests may be received at the API gateway 704, which may direct the received data requests to corresponding services, such as ISP-MSD activity service 705 or ISP-MSD-CDR service 706.

In an example, the ISP-MSD-Activity service 705 and/or the ISP-MSD-CDR service 706 may query the ISP inventory system 707 to acquire the requested data. The ISP-MSD-Activity service 705 may query the ISP inventory system 707 to acquire usage details for a respective LOB. In addition, the ISP-MSD-CDR service 706 may query the ISP inventory system 707 may acquire mobile user inventory for a respective LOB.

According to exemplary aspects, the ISP inventory system 707 may be an internal data storage server or data store that may reside on an organization's internet or internal network. The ISP inventory system 707 may extract or request data from the one or more public cloud vendors or UCaaS providers. The ISP inventory system 707 may obtain data from the public cloud vendors or UCaaS providers according to a preset schedule, in response to an event or request, or based on data traffic/volume.

Further, according to exemplary aspects, the MSD-Batch Services may collect communication data facilitated via one or more public cloud servicers according to region. As illustrated in FIG. 7, the MSD-Batch service for APAC (Asia-Pacific) region 708 may transmit a request for extracting usage data for the APAC region from a CSV file stored in the cloud object storage bucket 709. The cloud object storage bucket 709 acquires cloned CSV from a SFTP server 710. The SFTP server 710 acquires the source CSV file for storage in the SFTP (Secure File Transfer Protocol) server 710 from MSD (Mass Storage Device) 711, a public cloud vendor or a UCaaS provider.

The SFTP Server 710 may also transmit a copy of the CSV file received from the MSD 711 to COMBI (Computer integrated object oriented model) service 712. The COMBI service 712 will then transform the received CSV file to XML file and transmit it to a cloud network 713. Then the XML file is provided to an external system, such as the connected archive 714.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a single uniform vendor agnostic platform for uniformly accessing public cloud vendor service data of a plurality of public cloud vendors, the method comprising:

performing, using a processor and a memory:

acquiring, via a public cloud network interface, communication data associated with communication facilitated via a public cloud vendor among the plurality of public cloud vendors residing on an external network, wherein each of the plurality of public cloud vendors has a separate user interface, security requirements, storage requirements and integration/connectivity requirements;

ingesting and storing, the acquired communication data, on a server residing on an internal network of a target entity, wherein the server residing on the internal network of the target entity stores vendor data of the plurality of public cloud vendors;

receiving, a request for the communication data via the single uniform vendor agnostic platform, on a client device residing on the internal network;

transmitting the request for the communication data to the server residing on the internal network;

retrieving, in response to receiving the request for the communication data, the requested communication data from the server residing on the internal network without making a separate request to the public cloud vendor residing on the external network in response to the received request; and transmitting, via the single uniform vendor agnostic platform, the retrieved communication data to the client device, wherein the public cloud vendor is configured to be replaced by a new public cloud vendor, and wherein only a public cloud network interface portion of the internal network is modified to accommodate the new public cloud vendor without requiring a change to the client device when the public cloud vendor is replaced with the new public cloud vendor.

2. The method according to claim 1, wherein the communication data includes data on a communication transmitted by the client device.

3. The method according to claim 1, wherein the communication data is acquired from the public cloud vendor via a batch processing.

4. The method according to claim 1, wherein the communication data is acquired from the public cloud vendor in response to an event.

5. The method according to claim 1, wherein the communication data is acquired from the public cloud vendor in response to data volume.

6. The method according to claim 1, wherein the communication data associated with the communication facilitated via the public cloud vendor is retrieved within the internal network.

7. The method according to claim 1, wherein the communication data is retrieved in real-time.

8. The method according to claim 1, wherein the communication data is acquired from the public cloud vendor as provided by one or more machine learning algorithms.

9. A system for providing a single uniform vendor agnostic platform for uniformly accessing public cloud vendor service data of a plurality of public cloud vendors, the system comprising:

at least one processor;

at least one memory; and at least one communication circuit, wherein the at least one processor performs:

acquiring, via a public cloud network interface, communication data associated with communication facilitated via a public cloud vendor among the plurality of public cloud vendors residing on an external network, wherein each of the plurality of public cloud vendors has a separate user interface, security requirements, storage requirements and integration/connectivity requirements;

ingesting and storing, the acquired communication data, on a server residing on an internal network of a target entity, wherein the server residing on the internal network of the target entity stores vendor data of the plurality of public cloud vendors;

receiving, a request for the communication data via the single uniform vendor agnostic platform, on a client device residing on the internal network;

transmitting the request for the communication data to the server residing on the internal network;

retrieving, in response to receiving the request for the communication data, the requested communication data from the server residing on the internal network without making a separate request to the public cloud vendor residing on the external network in response to the received request; and transmitting, via the single uniform vendor agnostic platform, the retrieved communication data to the client device wherein the public cloud vendor is configured to be replaced by a new public cloud vendor, and wherein only a public cloud network interface portion of the internal network is modified to accommodate the new public cloud vendor without requiring a change to the client device when the public cloud vendor is replaced with the new public cloud vendor.

10. The system according to claim 9, wherein the communication data includes data on a communication transmitted by the client device.

11. The system according to claim 9, wherein the communication data is acquired from the public cloud vendor via a batch processing.

12. The system according to claim 9, wherein the communication data is acquired from the public cloud vendor in response to an event.

13. The system according to claim 9, wherein the communication data is acquired from the public cloud vendor in response to data volume.

14. The system according to claim 9, wherein the communication data associated with the communication facilitated via the public cloud vendor is retrieved within the internal network.

15. The system according to claim 9, wherein the communication data is retrieved in real-time.

16. The system according to claim 9, wherein the communication data is acquired from the public cloud vendor as provided by one or more machine learning algorithms.

17. A non-transitory computer readable storage medium that stores a computer program for providing a single uniform vendor agnostic platform for uniformly accessing public cloud vendor service data of a plurality of public cloud vendors, the computer program, when executed by a processor, causing a system to perform a process comprising:

acquiring, via a public cloud network interface, communication data associated with communication facilitated via a public cloud vendor among the plurality of public cloud vendors residing on an external network, wherein each of the plurality of public cloud vendors has a separate user interface, security requirements, storage requirements and integration/connectivity requirements;

ingesting and storing, the acquired communication data, on a server residing on an internal network of a target entity, wherein the server residing on the internal network of the target entity stores vendor data of the plurality of public cloud vendors;

receiving, a request for the communication data via the single uniform vendor agnostic platform, on a client device residing on the internal network;

transmitting the request for the communication data to the server residing on the internal network;

retrieving, in response to receiving the request for the communication data, the requested communication data from the server residing on the internal network without making a separate request to the public cloud vendor residing on the external network in response to the received request; and transmitting, via the single uniform vendor agnostic platform, the retrieved communication data to the client device, wherein the public cloud vendor is configured to be replaced by a new public cloud vendor, and wherein only a public cloud network interface portion of the internal network is modified to accommodate the new public cloud vendor without requiring a change to the client device when the public cloud vendor is replaced with the new public cloud vendor.

* * * * *